(12) United States Patent
Kondo

(10) Patent No.: US 7,227,572 B2
(45) Date of Patent: Jun. 5, 2007

(54) IMAGE SENSING APPARATUS, SIGNAL PROCESSING METHOD THEREOF, PROGRAM, AND STORAGE MEDIUM

(75) Inventor: Hiroshi Kondo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 672 days.

(21) Appl. No.: 10/238,332

(22) Filed: Sep. 9, 2002

(65) Prior Publication Data

US 2003/0048366 A1 Mar. 13, 2003

(30) Foreign Application Priority Data

Sep. 10, 2001 (JP) ............... 2001-273014

(51) Int. Cl.
*H04N 9/73* (2006.01)
*H04N 5/238* (2006.01)
(52) U.S. Cl. ............... 348/223.1; 348/364; 348/317
(58) Field of Classification Search ............... None
See application file for complete search history.

(56) References Cited

U.S. PATENT DOCUMENTS 5,198,890 A * 3/1993 Suga ............... 348/227.1
5,260,774 A 11/1993 Takayama
6,559,889 B2 * 5/2003 Tanaka et al. ............... 348/299
6,621,519 B2 * 9/2003 Nakayama et al. ...... 348/223.1
6,778,216 B1 * 8/2004 Lin ............... 348/333.11
6,930,710 B1 * 8/2005 Classen et al. ........... 348/223.1
6,967,680 B1 * 11/2005 Kagle et al. ............. 348/222.1
2004/0105016 A1 * 6/2004 Sasaki ............... 348/222.1

FOREIGN PATENT DOCUMENTS

JP 2278984 11/1990

* cited by examiner

*Primary Examiner*—Ngoc-Yen Vu
*Assistant Examiner*—Dillon Durnford-Geszvain
(74) *Attorney, Agent, or Firm*—Morgan & Finnegan LLP

(57) ABSTRACT

This invention is to shorten the time of white balance processing. In order to achieve this object, this invention provides an image sensing apparatus including an image sensing section which senses an object image and scans charge of pixels by interlaced-scanning to acquire image data of one frame by two fields, a memory which temporarily sequentially stores the image data output from the image sensing section, and a control section which reads out the image data in a first field and that in a second field from the memory and calculates a white balance coefficient before the image data in the second field is completely read from the image sensing section.

13 Claims, 7 Drawing Sheets

FIG. 6

| LINE | | | | | | | | | | |
|---|---|---|---|---|---|---|---|---|---|---|
| 1 | R | G | R | G | R | · | · | R | · | R |
| 2 | G | B | G | B | G | · | · | G | · | G |
| 3 | R | G | R | G | R | · | · | R | · | R |
| 4 | G | B | G | B | G | · | · | G | · | G |
| 5 | R | G | R | G | R | · | · | R | · | R |
| 6 | · | · | · | · | · | | | · | | · |
| 7 | · | · | · | · | · | | | · | | · |
| 8 | · | · | · | · | · | | | · | | · |
| 9 | · | · | · | · | · | | | · | | · |
| 10 | · | · | · | · | · | | | · | | · |
| 11 | · | · | · | · | · | | | · | | · |
| : | | | | | | | | | | |

FIG. 7

|   |   |   |   |   |   |   |   |
|---|---|---|---|---|---|---|---|
| 1 | R | G | R | G | R | G | R |
| 2 | G | B | G | B | G | B | G |
| 3 | R | G | R | G | R | G | R |
| 4 | G | B | G | B | G | B | G |
| 5 | R | G | R | G | R | G | R |
| 6 | G | B | G | B | G | B | G |
| 7 | R | G | R | G | R | G | R |

PRIOR ART

IMAGE SENSING APPARATUS, SIGNAL PROCESSING METHOD THEREOF, PROGRAM, AND STORAGE MEDIUM

FIELD OF THE INVENTION

The present invention relates to an image sensing apparatus which executes white balance calculation.

BACKGROUND OF THE INVENTION

Conventionally, image sensing apparatuses such as digital cameras are commercially available, each of which senses a still image sensed with an image sensing element such as a CCD using a memory card having a solid-state memory element as a recording medium.

In these image sensing apparatuses, photographing processing is executed while temporarily writing output image data from the image sensing element in a buffer memory. Then, development/compression processing is executed in which image processing and compression processing are executed, and the image data is stored in the buffer memory again. After that, processing of writing the image data on a recording medium on a detachable card is generally performed.

White balance control in photographing processing in such an image sensing apparatus is conventionally executed in accordance with the following procedure. First, unprocessed raw data (to be referred to as RAW image data hereinafter) that is captured from the image sensing element into the memory is read out. Image data recognized as white in the readout image data is extracted in accordance with a predetermined algorithm, and a white balance (WB) coefficient is decided (this processing will be called WB calculation hereinafter). Chrominance signals are multiplied by the WB coefficient obtained as a result of calculation, thereby correcting white data.

When an image sensing element of frame read scheme in which image data is read by interlaced scanning on every other line is used, RAW image data of one frame is generated by two fields. If the color filters of the image sensing element have a Bayer matrix as shown in FIG. 7, only R and G signals are obtained by reading one field. That is, all pieces of color information cannot be obtained. For white balance calculation, at least R and B signals are necessary. In some cases, the WB calculation algorithm requires a luminance signal generated using all the R, G, and B signals. That is, when an image sensing element of frame read scheme in which image data is read by interlaced scanning on every other line is used, WB calculation is started after RAW data of two fields, i.e., one frame is written in the memory. For this reason, for the WB calculation, a time must be taken into consideration. This impedes the time between image sensing frames from shortening in, e.g., continuously photographing still images.

SUMMARY OF THE INVENTION

The present invention has been made to solve the above-described problem, and has as its object to shorten the time of white balance processing.

In order to achieve the above-described object, according to the present invention, there is provided an image sensing apparatus comprising an image sensing device which senses an object image and scans charge of pixels by interlaced-scanning to acquire image data of one frame by two fields, a memory which temporarily sequentially stores the image data output from the image sensing device, and a controller which reads out the image data from the memory and calculates a white balance coefficient before the image data in a second field is completely read from the image sensing device.

There is also provided a signal processing method of an image sensing apparatus having an image sensing device which senses an object image and scans charge of pixels by interlaced-scanning to acquire image data of one frame by two fields, wherein before the image data in a second field is completely read from the image sensing device, the image data is read out from a memory which temporarily sequentially stores the image data output from the image sensing device, and a white balance coefficient is calculated.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 is a view showing the layout of image data in the DRAM 30 when the image data is written up to the second line of the second field in the embodiment; and FIG. 7 is a view showing the color filter matrix of the image sensing element 14.

DETAILED DESCRIPTION OF THE PREFERRED EMBODIMENT

The embodiment of the present invention will be described below with reference to the accompanying drawings.

Figure 1:
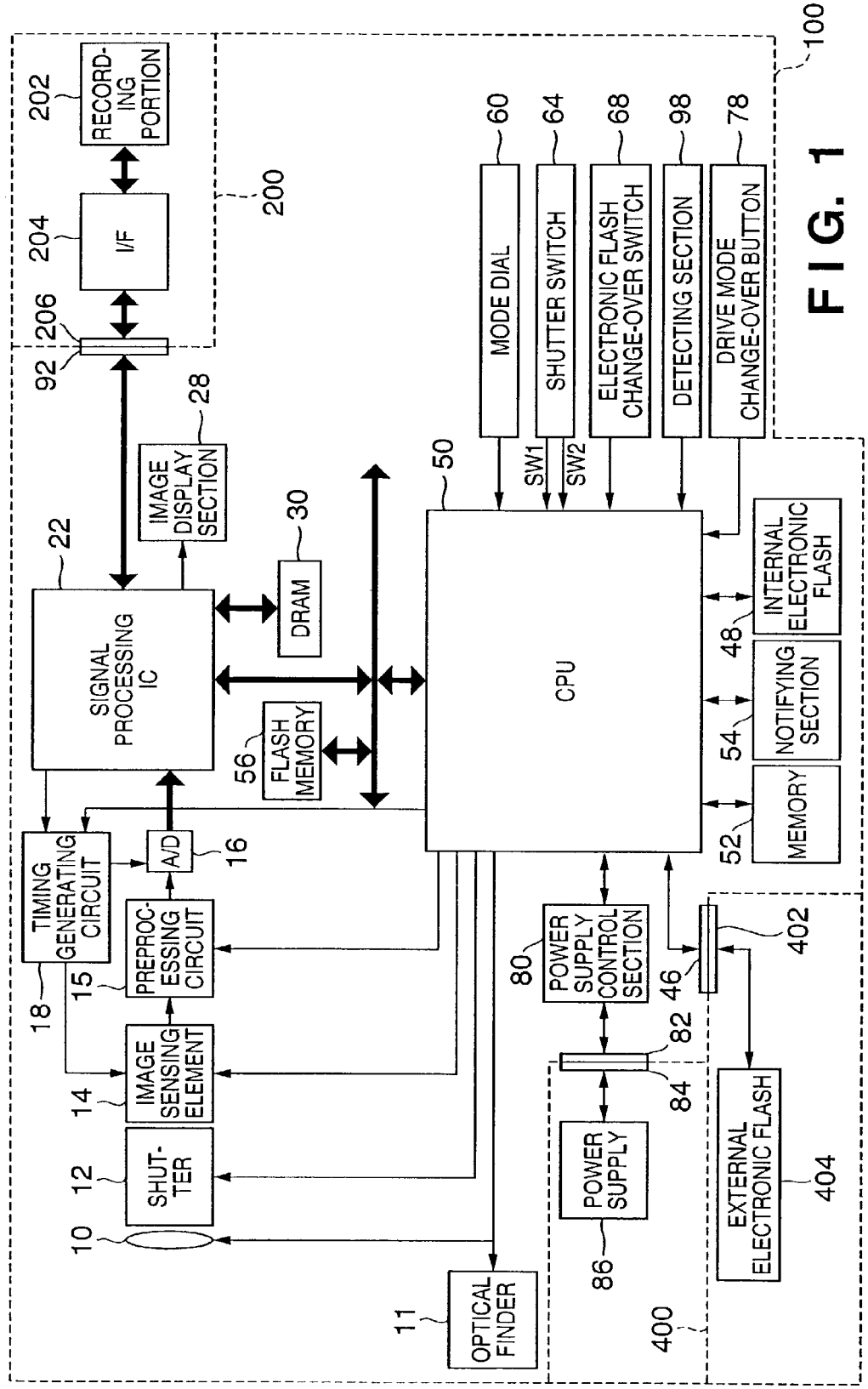
FIG. 1 is a block diagram of an image sensing apparatus according to the embodiment.

FIG. 1 is a block diagram showing an image sensing apparatus which photographs a still image using an image sensing element of frame read scheme in which the image output of an entire frame is read in one frame period by executing one-line read of interlaced scanning as an embodiment of the present invention.

Referring to FIG. 1, an image sensing apparatus main body 100 has the following arrangement. A photographing lens 10 includes a zoom lens and focus lens. An optical finder 11 is used to check an object image. A shutter 12 also serves as an aperture. An image sensing element 14 is made of a CCD or the like and converts an optical image into an electrical signal through a primary color mosaic filter as shown in FIG. 7. A preprocessing circuit 15 includes a CDS (Correlated Double Sampling) circuit for removing output noise of the image sensing element 14 and AGC (Automatic Gain Control) circuit. An A/D converter 16 converts an analog signal output from the preprocessing circuit 15 into a digital signal.

A timing generating circuit (TG) 18 supplies a clock signal or control signal to the image sensing element 14 and A/D converter 16. The timing is controlled by a signal processing IC 22.

The signal processing IC 22 executes predetermined pixel interpolation processing, color conversion processing, enlargement/reduction, or image data format conversion for data from the A/D converter 16 or data from a DRAM 30 in accordance with an instruction from a CPU 50. The signal processing IC 22 incorporates a DMA controller, D/A converter, and compression/expansion circuit for compressing/expanding image data. The signal processing IC 22 also executes predetermined arithmetic processing using the sensed image data and stores the obtained operation result in the DRAM 30. On the basis of this operation result, the CPU 50 performs AWB (Auto White Balance) processing of TTL scheme, AF (Auto Focus) processing, AE (Auto Exposure) processing, and EF (Electronic Flash pre-emission) processing.

The image data to be displayed, which is written in the DRAM 30, is displayed on an image display section 28 made of a TFT LCD through the D/A converter (not shown) in the signal processing IC 22. That is, when sensed image data is sequentially displayed using the image display section 28 instead of only reproducing a recorded image, an electronic finder function can be implemented. The image display section 28 is used to display not only an image but also various kinds of information and mode setting situations. The image display section 28 can arbitrarily turn on/off its display in accordance with an instruction from the CPU 50. In a display OFF state, power consumption of the apparatus main body 100 can be largely reduced. The user can store the display portion of the image display section 28 while protecting it by directing the display portion to the camera body side. In this case, the display operation of the image display section 28 can be stopped as the stored state is detected by a detection switch 98.

The DRAM 30 is a memory used to temporarily store uncompressed sensed data, hold the AF/AE/AWB/EF operation results, hold an image to be displayed on the image display section 28, or hold compressed image data. The DRAM 30 has a storage capacity large enough to store a predetermined number of still images or a moving image for a predetermined time.

A zoom control circuit controls zooming of the photographing lens 10 and optical finder 11.

A connector 46 is also called an accessory shoe and has an electrical contact and mechanical fixing means for an external electronic flash device 400. The external electronic flash device 400 has a connector 402 to be connected to the accessory shoe and an external electronic flash 404. An internal electronic flash 48 has a TTL light control function.

The CPU 50 controls the entire digital camera apparatus 100. The CPU 50 executes AF/AE/AWB/EF control on the basis of the AF/AE/AWB/EF operation results stored in the DRAM 30 by the signal processing IC 22. The CPU 50 also executes data flow control for the signal processing IC 22, various kinds of key scan operations, zoom control, and communication with peripheral modules. A memory 52 stores variables and the like for the operation of the CPU 50.

A notifying section 54 comprises indicator sections such as a liquid crystal display device and loudspeaker which indicate an operation state or a message using a character, image, and sound in accordance with program execution by the CPU 50. One or a plurality of notifying sections 54 made of a combination of, e.g., an LCD, LED, and sound generation element are provided at positions easy to see around the operation section of the apparatus main body 100.

Examples of the display contents of the notifying section 54 are single shot/sequential image sensing, a self timer, an image compression rate, the number of recording pixels, the number of sensed images, the number of recordable images, a shutter speed, an f-number, exposure compensation, flash illumination, red-eye effect mitigation, macroimage sensing, a buzzer-set state, a timer battery level, a battery level, an error state, information indicated by a number in a plurality of digits, an attached state of a recording medium 200, operation of communication I/F, and date and time.

A flash memory 56 is electrically erasable/recordable. A program necessary for operating the CPU 50 and adjustment data unique to the camera are written in the flash memory 56 in advance.

Main operation members will be described below in detail.

A mode dial switch 60 has a two-stage structure. At the lower stage, three states, i.e., the power off state, photographing mode, and reproduction mode can be switched. Various kinds of photographing modes to be set by the user in accordance with the purpose and scene are assigned to the upper stage where a full-auto photographing mode (AUTO), program photographing mode, shutter-speed-priority photographing mode, aperture-priority photographing mode, manual photographing mode, pan-focus mode, portrait mode, landscape mode, night view mode, color effect mode, stitch assist mode, and moving image photographing mode can be selectively set.

A shutter switch 64 is formed from two-stroke switches SW1 and SW2. When the shutter switch 64 is pressed to the first stroke position, the switch SW1 is turned on to instruct the start of operation such as AF (Auto Focus) processing, AE (Auto Exposure) processing, or AWB (Auto White Balance) processing. When the shutter switch 64 is pressed to the second stroke position, the switch SW2 is turned on to write in the DRAM 30 image data based on a signal read from the image sensing element 14 in the DRAM 30 through the A/D converter 16 and signal processing IC 22. Next, the signal processing IC 22 reads out the image data from the DRAM 30 in accordance with an instruction from the CPU 50, executes image processing such as color correction, pixel interpolation, and color conversion, compresses the image data, and writes it in the recording medium 200.

An electronic flash change-over switch 68 switches the light emission mode of the electronic flash in photographing to a forcible light emission mode, non-emission mode, or auto emission mode.

A drive mode change-over button 78 cyclically switches between the single shot mode, the sequential image sensing mode, and the self timer mode every time the button is pressed.

A power supply control section 80 is constructed by a battery detection circuit, DC/DC converter, a switch circuit for switching a block to be energized, and the like. The power supply control section 80 detects the presence/absence of a battery, the type of the battery, and the battery level. The power supply control section 80 controls the DC/DC converter on the basis of the detection result and an instruction from the CPU 50 so as to supply a necessary voltage to the sections including the recording medium for a necessary period and also indicates the battery level on the notifying section 54 or image display section 28, as needed.

Reference numerals 82 and 84 denote connectors; and 86, a power supply section comprised of a primary battery such as an alkali battery or lithium battery, a secondary battery such as an NiCd battery, NiMH battery, or Li battery, or an AC adapter.

The recording medium 200 is formed from a memory card or hard disk and has a recording portion 202 made of a semiconductor memory or magnetic disk, an interface 204 to the digital camera apparatus 100, and a connector 206 connected to the digital camera apparatus 100. A connector 92 is connected to the recording medium such as a memory card or hard disk.

A detecting section 98 includes a detection switch capable of detecting whether the display portion of the image display section 28 is directed to the image sensing apparatus 100 and stored, a battery cover opening/closing detection switch for detecting the open state of the battery cover, and a detection switch for detecting the attached state of the external electronic flash 404.

Figure 2:
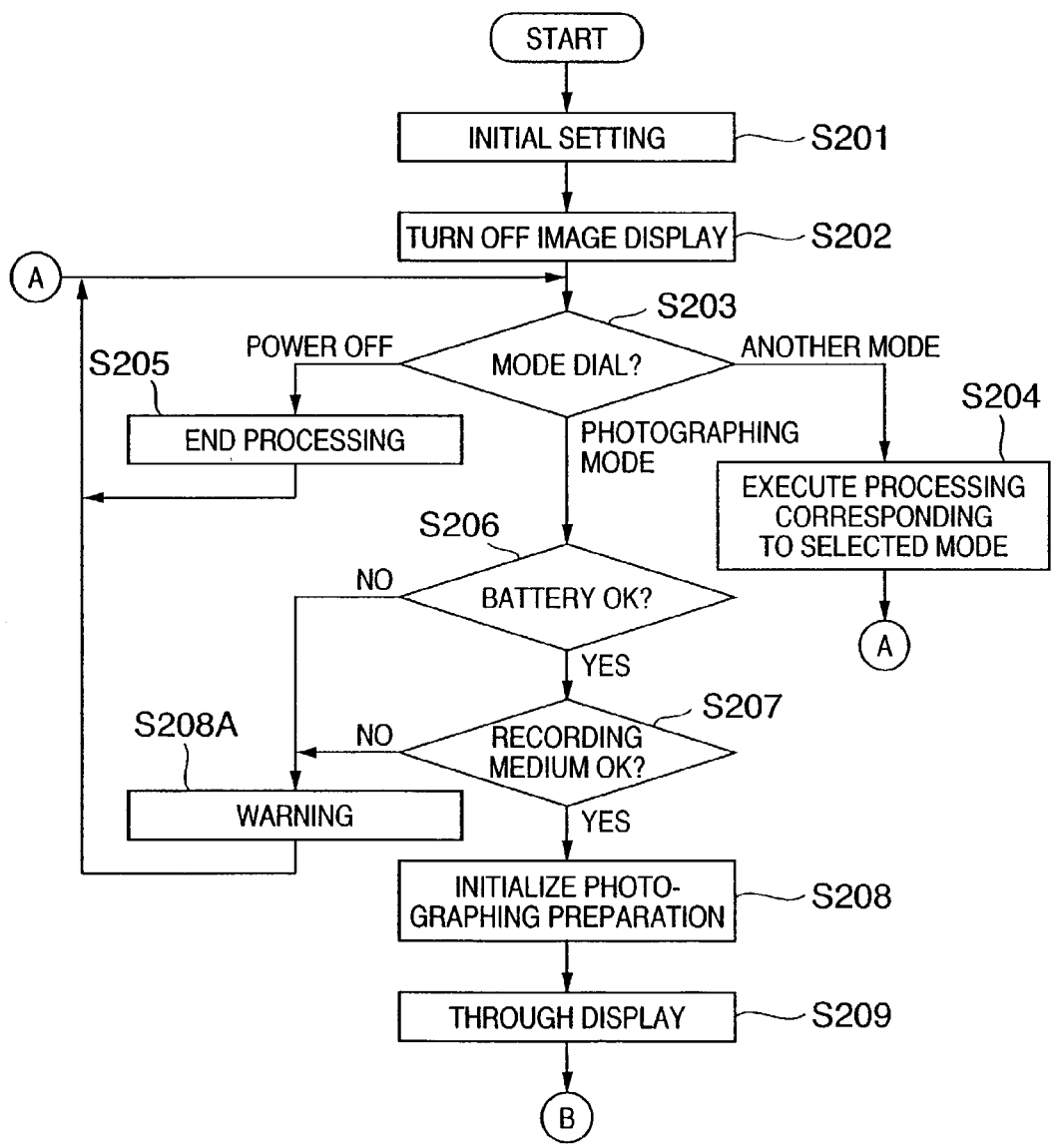
FIG. 2 is an operation processing flow chart of the main routine of the image sensing apparatus according to the embodiment.
Figure 3:
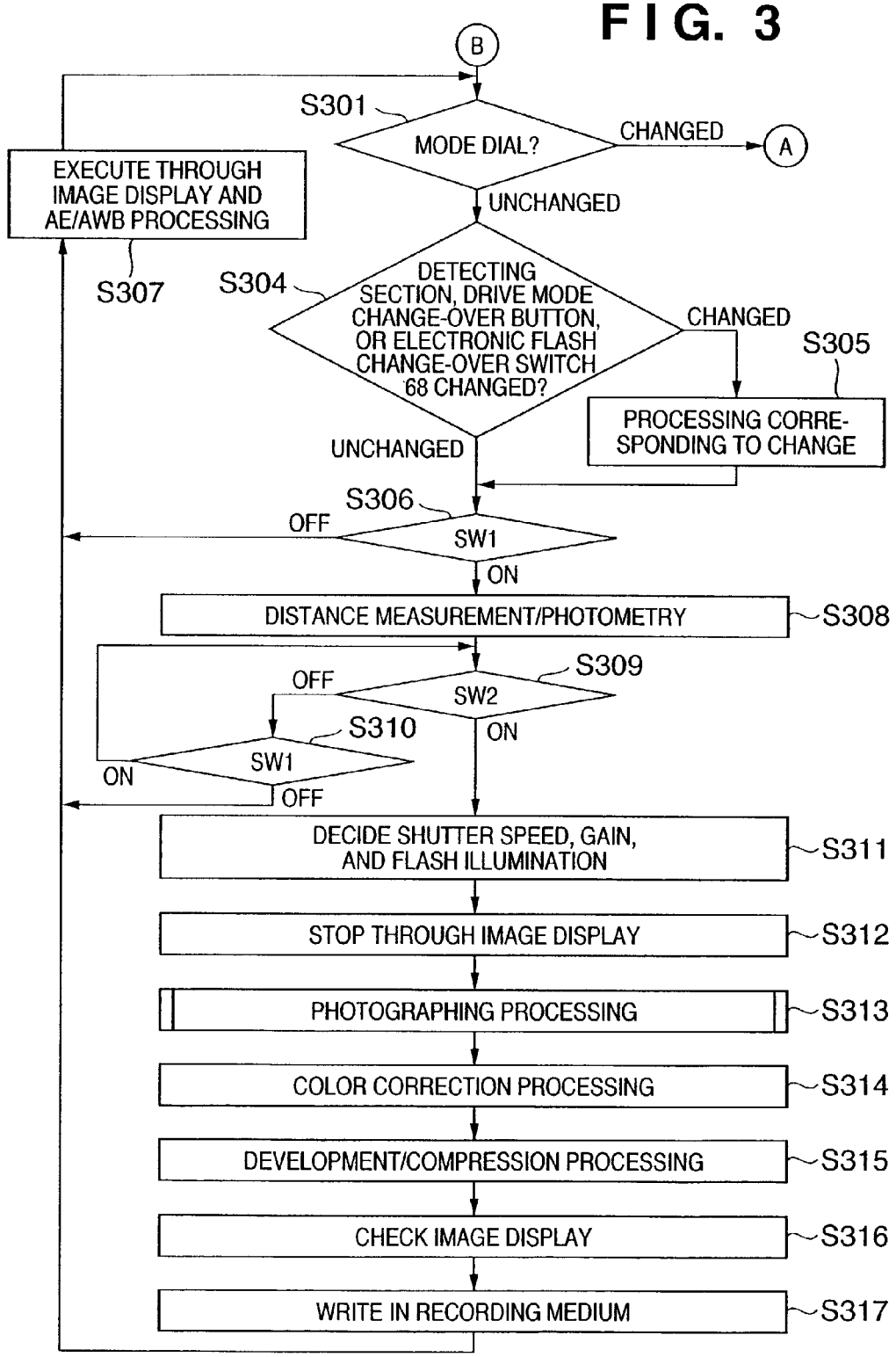
FIG. 3 is an operation processing flow chart of the main routine of the image sensing apparatus according to the embodiment.

FIGS. 2 and 3 are flow charts of the main routine of the image sensing apparatus 100 according to this embodiment. The main operation of the image sensing apparatus 100 will be described with reference to FIGS. 2 and 3.

The CPU 50 determines the set position of the mode dial 60. If the mode dial 60 is set at "power off" (S203), the display of the display section 28 is changed to the end state, and the image sensing section is protected by closing the aperture/shutter 12. Parameters, set values, and set modes, including flags and control variables, are recorded in the memory 52. Predetermined end processing of, e.g., cutting off unnecessary power supply to the sections in the digital camera apparatus 100, including the image display section 28, by the power supply control section 80, is executed (S205). Then, the flow returns to step S203.

If the mode dial 60 is set in the photographing mode (S203), the flow advances to step S206. If the mode dial 60 is set in another mode (S203), the CPU 50 executes processing corresponding to the selected mode (S204). When the processing is ended, the flow returns to step S203.

The CPU 50 causes the power supply control section 80 to determine whether the remaining capacity or operation situation of the power supply 86 formed from a battery or the like poses a problem on the operation of the image sensing apparatus 100 (S206). If NO in step S206, predetermined warning is done by an image or sound using the image display section 28 or notifying section 54 (S208). Then, the flow returns to step S203.

If the power supply section 86 has no problem (S206), the CPU 50 determines whether the operation state of the recording medium 200 has a problem on the operation of the image sensing apparatus 100 and, more particularly, on image data recording/reproducing operation on/from the recording medium (S207). If NO in step S207, predetermined warning is done by an image or sound using the image display section 28 or indicator section 54 (S208). Then, the flow returns to step S203.

If the operation state of the recording medium 200 has no problem (S207), the flow advances to step S208.

After that, photographing preparation for displaying a through image (a moving image sensed by the image sensing element 14 to be displayed as a finder function before or after photographing a still image) on the image display section 28 is initialized (S208). When preparation is completed, the CPU 50 starts displaying the through image on the image display section 28 (S209).

The camera operation in photographing a still image in a through image display state will be described next with reference to FIG. 3.

If the mode dial 60 is changed (S301), the flow returns to step S203 to check the dial state. If the mode dial 60 is not changed, it is checked whether any one of the detecting section 98, drive mode change-over button 78, and electronic flash change-over switch 68 is changed (S304). If any one of them is changed, processing corresponding to the changed portion is performed (S305).

If the shutter switch SW1 is not pressed (S306), processing of continuing through image display is performed. In addition, the signal processing IC 22 executes predetermined photometric operation for the signal obtained from the image sensing element 14 and stores the operation result in the DRAM 30. The CPU 50 executes AE/AWB processing for the through image on the basis of the operation result (S307). Then, the flow returns to step S301.

If it is determined in step S306 that the shutter switch SW1 is pressed, the CPU 50 performs distance measurement operation on the basis of focus information and photometry information, which are stored in the DRAM 30, focuses the photographing lens 10 on the object, executes photometry operation, and controls the aperture/shutter 12 to an f-number obtained in accordance with a program chart for each photographing mode (S308).

Next, the state of the switch SW2 is checked (S309). If the switch SW2 is not pressed yet, the state of the shutter switch SW1 is checked again (S310). When the shutter switch SW1 is released, the flow returns to step S307. When the shutter switch SW1 is kept pressed, the state of the switch SW2 is continuously monitored (S309).

When the switch SW2 is pressed in step S309, the settings of the shutter speed, image sensing output gain, flash illumination, and the like in photographing are finally decided with reference to the program diagrams of the current photometry result and photographing mode (S311). In addition, through image display on the image display section 28 is stopped. The flow advances to the photographing sequence (S312).

First, photographing processing of executing a series of photographing operations is executed (S313). After the photographing processing, unprocessed image data before signal processing, which is read from the image sensing element 14 through the A/D converter 16, is stored in the DRAM 30 (this data will be referred to as RAW image data hereinafter). The signal processing IC 22 reads out the RAW data from the DRAM 30 in accordance with an instruction from the CPU 50 and executes color correction (white balance correction) on the basis of a WB coefficient obtained by photographing processing (S314).

Predetermined development/compression processing such as JPEG is executed, and the processed image data is stored in the DRAM 30 (S315). The processed image data is converted into a display image and stored in the DRAM 30 again. The signal processing IC 22 reads out the display image data at a predetermined rate, D/A-converts the image data, and outputs it to the image display section 28, thereby displaying the check image of the sensed still image (S316). The compressed image data stored in the DRAM 30 in step S315 is written in the recording medium 200 (S317), and the flow returns to step S307.

Figure 4:
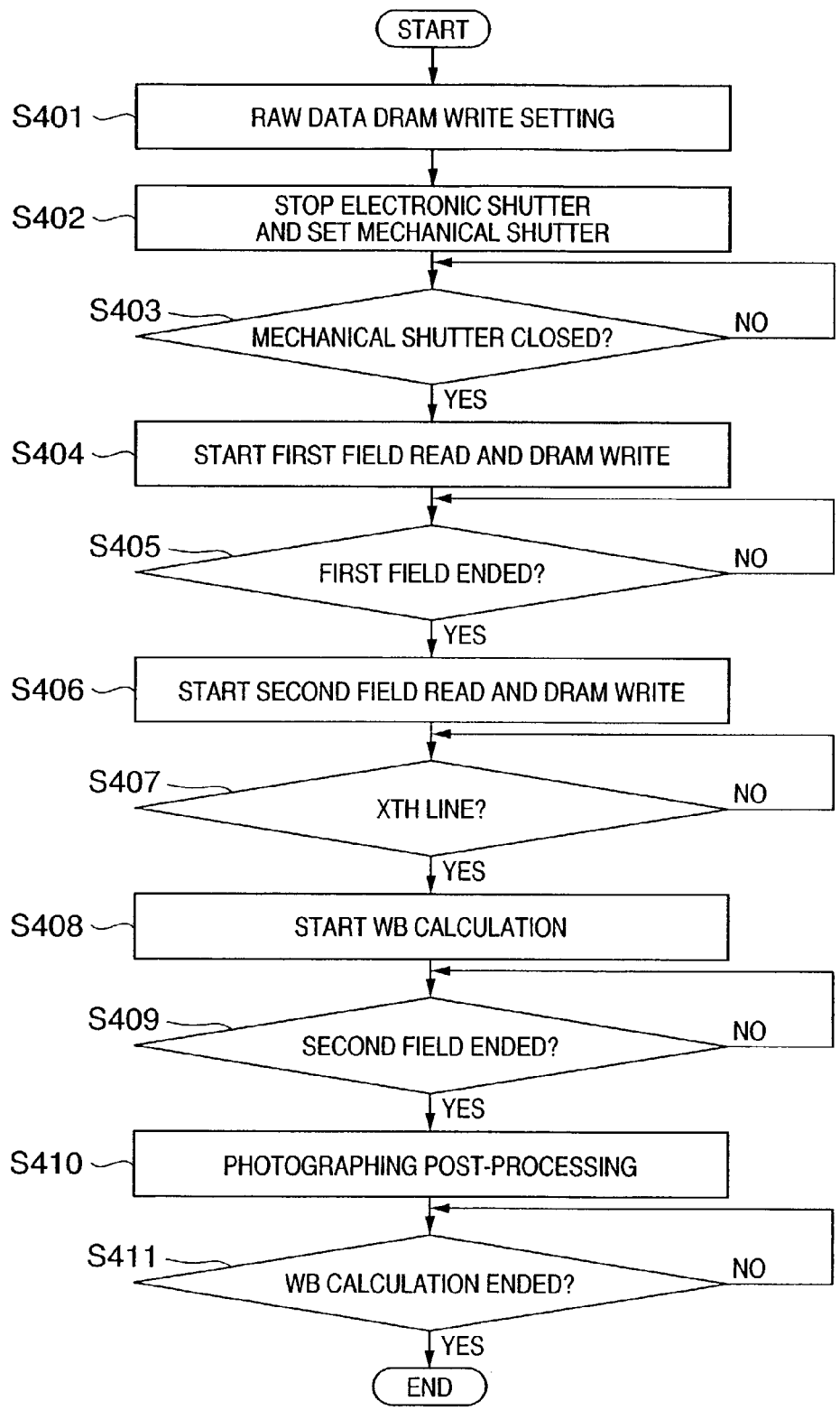
FIG. 4 is an operation processing flow chart of still image sensing operation of the image sensing apparatus according to the embodiment.

FIG. 4 is an operation processing flow chart showing details of the photographing processing in step S313.

The CPU 50 performs DRAM write setting to temporarily store the RAW image data output from the image sensing element 14 in the DRAM 30 (S401). Write addresses are set for the DMA controller such that the image data is written in the DRAM 30 on every other line in accordance with an interlaced read.

An electronic shutter stop command is issued to the timing generating circuit 18 to start exposure. In addition, the shutter closing timing of the aperture/shutter 12 is set in the timer in the CPU in accordance with a predetermined shutter speed (S402). The timer in the CPU is designed to output a pulse that fully opens the aperture/shutter 12 when counting the designated time.

After the shutter 12 is closed (S403), a write start instruction for the first field of the DRAM regions set in step S401 is issued in accordance with the write settings in step S401. In addition, an instruction is issued to the timing generator 18 to read image data (odd-numbered lines) of the first field from the image sensing element 14 (S404). When the RAW image data write operation in the first field of the DRAM 30 is ended (S405), a write start instruction for the second field is issued. In addition, an instruction is issued to the timing generator 18 to read image data (even-numbered lines) of the second field from the image sensing element 14 (S406).

It is determined whether the write operation in the Xth line of the second field of the DRAM 30 is ended (S407). If YES in step S407, before the read operation of the image data in the second field from the image sensing element 14 is ended, the signal processing IC 22 reads out the image data, which is written midway in the second field of the DRAM 30, sequentially from the upper side of FIG. 7 in an order of the first line of the first field, the first line of the second field, the second line of the first field, . . . , and starts WB calculation (S408). When the RAW image data write operation in the second field of the DRAM 30 is ended (S409), photographing post-processing of opening the mechanical shutter and resuming the electronic shutter operation is executed such that the next photographing can be quickly done (S410). It is also determined whether the WB (white balance) coefficient calculation is ended (S411). If YES in step S411, photographing processing of one still image is ended, and the processed image is displayed on the image display section 28 for a predetermined time.

The method of determining the Xth line in step S407 will be described. The Xth line determining method must guarantee that the DRAM write in the second field be ended before the DRAM read in the WB calculation.

Figure 5:
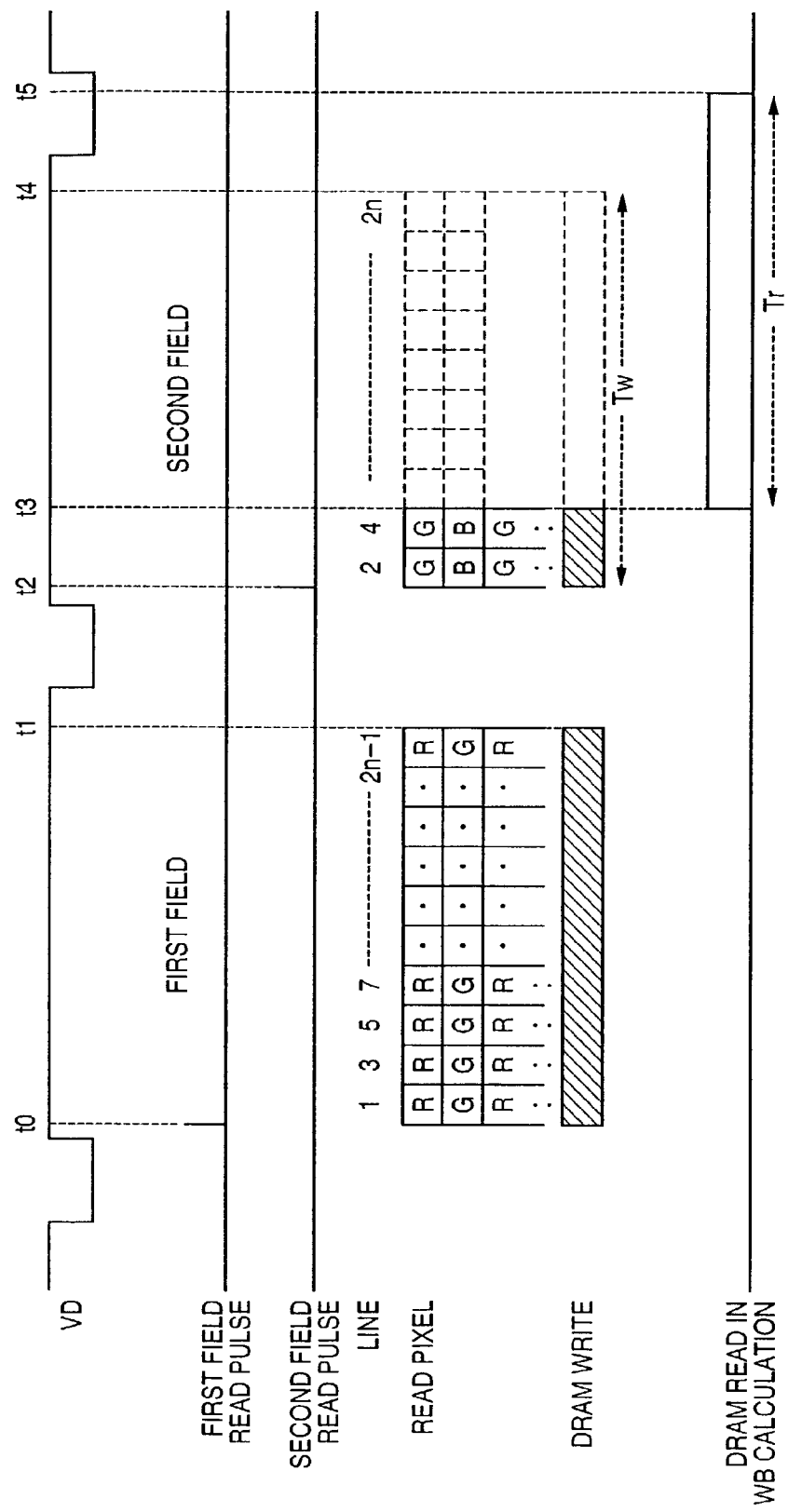
FIG. 5 is a timing chart of an image data read from an image sensing element 14 and an image data write/read in a DRAM 30 in the embodiment.

FIG. 5 is a timing chart showing pixels read to the DRAM and the start of WB coefficient calculation when X=2.

Referring to FIG. 5, when a first field read pulse is output from the timing generating circuit 18 at time t0, pixels having R and G color filters in the image data accumulated in the light-receiving portion of the image sensing element 14 as shown in FIG. 7 are output to the DRAM on every other lines through the image sensing element 14, preprocessing circuit 15, A/D converter 16, and signal processing IC 22. In FIG. 5, half (odd-numbered lines) of all the pixels are completely stored in the DRAM 30 at time t1.

When a second field read pulse is output from the timing generating circuit 18 at time t2, the remaining half of the image data accumulated in the light-receiving portion, i.e., the image data of the even-numbered lines corresponding to G and B color filters are output to the DRAM 30 in the same manner as described above. When the B and G image data are read out up to the second line of the second field at time t3, a memory read for WB coefficient calculation is started. At time t4, all pixels are stored in the DRAM 30. At time t5, the memory read in WB coefficient calculation is ended.

FIG. 6 is a view showing the layout of RAW image data in the DRAM 30 at the time t3 when X=2. As shown in FIG. 6, data are written on every other line in the DRAM 30 in an interlaced manner.

Referring to FIG. 6, the first to fourth lines contain all colors. For this portion, the WB coefficient can be calculated. The even-numbered lines from the sixth line have no data because the image data are not read at the time t3 yet.

In the interlaced-read-type image sensing element 14 of this embodiment, if a relationship given by (image data read rate of image sensing element)×2>
(image data read rate from DRAM 30 in WB coefficient calculation)

holds, the DRAM read in WB coefficient calculation is not executed ahead of the second field image data write operation in the DRAM 30. Hence, X can be set to several lines in consideration of a margin.

If the above relationship does not hold, letting Tw be the time required to write the second field image data in the DRAM 30, and Tr be the time required for the memory read in WB calculation in FIG. 5, t2 is decided such that $$t3-t2>Tw-Tr$$

holds. With this setting, the DRAM read for WB coefficient calculation is not executed ahead of the second field image data write operation in the DRAM 30.

As described above, in the image sensing apparatus 100 of this embodiment, before all image data read from the image sensing element 14 are stored in the DRAM 30, the memory read operation for white balance coefficient calculation is started. For this reason, the time from photographing to the end of the white balance processing operation can be largely shortened. In this embodiment, the image display section 28 displays a still image to check it after the white balance processing operation. Since the time until the check image display is short, stress after photographing can be eased, resulting in a great advantage.

In the above embodiment, white balance processing in photographing one still image has been described. The white balance processing operation of this embodiment can also be applied to sequential still image sensing. In this case, the time between frames during photographing can be shortened. For example, to sequentially photograph still images, an arrangement is available in which white balance coefficient calculation is executed only in photographing of the first still image, and the second and subsequent sensed images are processed using the same WB coefficient as that for the first still image. In this embodiment, the sequential image sensing interval between the first and second still images can be prevented from being longer than that for the second and subsequent still images. Hence, still images can be sequentially sensed almost at an equal interval from the first image.

In this embodiment, when the white balance coefficient calculation processing speed (the image data read rate from the DRAM 30) is much higher than the image data read rate from the image sensing element 14, the white balance coefficient can be calculated without storing in the DRAM 30 image data read from the image sensing element 14 to the second field. This is achieved by sequentially reading out the first field image data stored in the DRAM 30 in synchronism with the image data read from the image sensing element 14 to the second field.

Since the white balance processing in through image display in step S307 shown in FIG. 3 is executed just to obtain an image displayable on the image display section 28, processing shown in FIG. 4 is unnecessary.

The present invention can be achieved by, e.g., supplying software program codes for implementing the function of the above-described embodiment to an image signal processing apparatus through a network such as the Internet and causing the computer (or a CPU or MPU) of the image sensing apparatus to read out and execute the program codes stored in a storage medium.

In this case, the program codes read out from the storage medium implement the function of the CPU 50 of the above-described embodiment by themselves, and the storage medium which stores the program codes constitutes the present invention.

As the storage medium for supplying the program codes, for example, a floppy disk, hard disk, optical disk, magnetooptical disk, CD-ROM, CD-R, magnetic tape, nonvolatile memory card, ROM, or the like can be used.

The function of the above-described embodiment is implemented not only when the readout program codes are executed by the computer but also when the OS (Operating System) running on the computer performs part or all of actual processing on the basis of the instructions of the program codes.

The function of the above-described embodiment is also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

When the present invention is applied to the storage medium, it stores program codes corresponding to the above-described flow charts. In brief, modules indispensable for the image sensing apparatus of the present invention are stored in the storage medium.

As has been described above, according to the above embodiment, since the white balance calculation after photographing can be executed partially in parallel to the read operation of the image sensing element, for example, the time from photographing to check image display can be shortened.

As many apparently widely different embodiments of the present invention can be made without departing from the spirit and scope thereof, it is to be understood that the invention is not limited to the specific embodiments thereof except as defined in the appended claims.

What is claimed is:

1. An image sensing apparatus having an image sensing device which has a color filter including different first, second and third color components, said apparatus comprising:
   a reading device which sequentially reads a first field including the first and second color components and a second field including the second and third color components from the image sensing device by interlaced scanning in every one field interval;
   a storage device which stores an image signal output from said reading device;
   a controller which calculates a white balance coefficient on the basis of an image signal including the first and second color components read in the first field and stored in said storage device and an image signal including the second and third color components read in the second field, in parallel with reading operation of an image signal of the second field and after reading operation of the first field; and
   a white balance correction device which executes white balance correction to one frame image signal including the image signals of the first and second fields by using the white balance coefficient after the reading operation of the image signal of the second field from the image sensing device has been finished.

2. The apparatus according to claim 1, further comprising a white balance processing unit which performs white balance processing on the basis of the white balance coefficient as the white balance coefficient is calculated by said controller, and a display device which displays an image that has undergone the white balance processing by said white balance processing unit.

3. The apparatus according to claim 2, wherein said white balance processing unit performs a first white balance processing or a second white balance processing which is different from the first white balance processing,
   wherein said display device displays an image that has undergone the first white balance processing in a case that an image is displayed on said display device after an image sensing instruction has been arisen, and said display device displays an image that has undergone the second white balance processing in a case that an image is displayed on said display device before an image sensing instruction is arisen.

4. The apparatus according to claim 1, wherein a control device which controls the image data read operation from said storage so as to end the calculation of the white balance coefficient after an image data write operation of one frame in said storage is ended.

5. The apparatus according to claim 1, wherein a control device controls said reading device to start reading out the image data from said storage after an elapse of at least one field.

6. The apparatus according to claim 1, wherein a control device controls a timing of the image data read from said storage for the calculation of the white balance coefficient so that a read rate of the image data from said storage for the calculation of the white balance coefficient become lower than twice a rate of a read rate of the image data output from said image sensing device.

7. A signal processing method of an image sensing apparatus having an image sensing device which has a color filter including different first, second and third color components, said method comprising the steps of:
   sequentially reading a first field including the first and second color components and a second field including the second and third color components from the image sensing device by interlaced scanning in every one field interval;
   storing an image signal output in said reading step into a storage device;
   calculating a white balance coefficient on the basis of an image signal including the first and second components read in the first field and stored in said storage device and an image signal including the second and third color components read in the second field, in parallel with reading operation of an image signal of the second field and after reading operation of the first field; and
   executing white balance correction to one frame image signal including the image signals of the first and second fields by using the white balance coefficient after the reading operation of the image signal of the second field from the image sensing device has been finished.

8. The method according to claim 7, further comprising performing white balance processing on the basis of the white balance coefficient as the white balance coefficient is calculated in said white balance coefficient calculating step, and displaying an image that has undergone the white balance processing in said performing white balance processing step.

9. The method according to claim 8, further comprising displaying an image that has undergone a first white balance processing in a case that an image is displayed after an image sensing instruction has been arisen, and displaying an image that has undergone a second white balance processing which is different from the first white balance processing, in a case that an image is displayed before an image sensing instruction is arisen.

10. The method according to claim 7, wherein the image data read operation from the storage device is so controlled as to end the calculation of the white balance coefficient after image data write operation of one frame in the storage device is ended.

11. The method according to claim 7, wherein reading of the image data from the storage device is started after an elapse of at least one field.

12. The method according to claim 7, wherein a timing of the image data read from the storage device, which temporarily sequentially stores the image data, for the calculation of the white balance coefficient is controlled on the basis of a read rate of the image data from the storage device for the calculation of the white balance coefficient and a read rate of the image data output from the image sensing device.

13. A computer-readable storage medium which stores a program wherein the program causes a computer to execute the signal processing method of claim 7.

* * * * *